Figure 6:
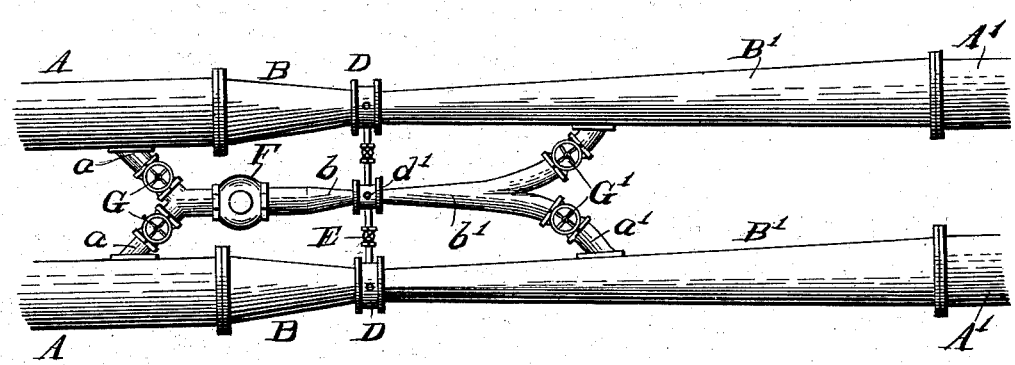

No. 749,645. PATENTED JAN. 12, 1904.
A. S. TUTTLE.
FLUID METER.
APPLICATION FILED APR. 29, 1901.
NO MODEL. 2 SHEETS—SHEET 1.
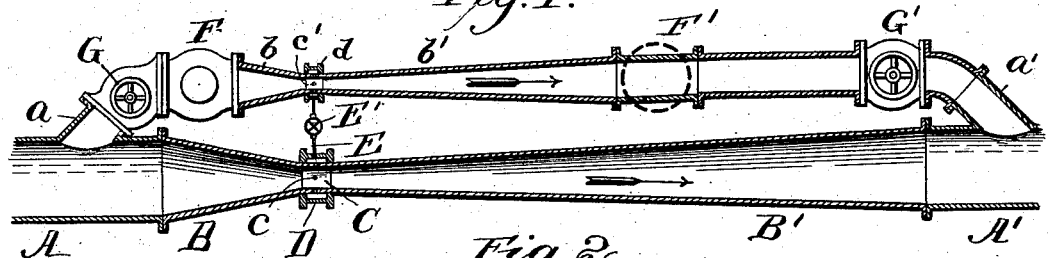
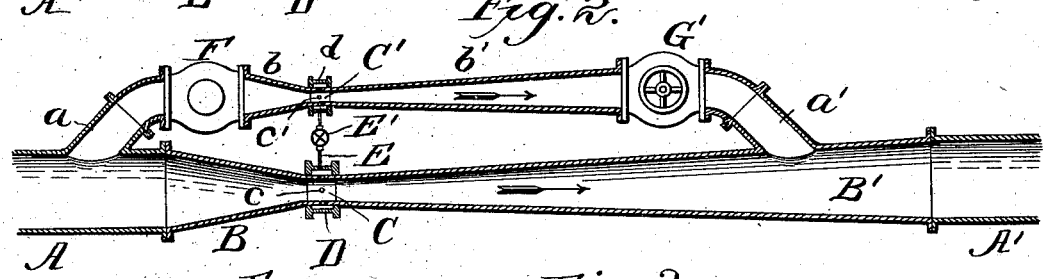
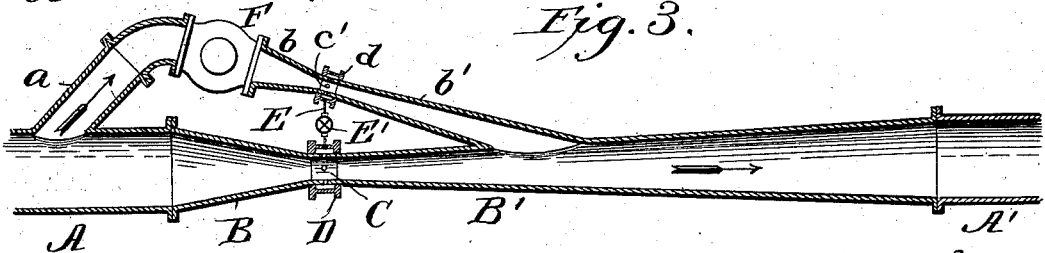
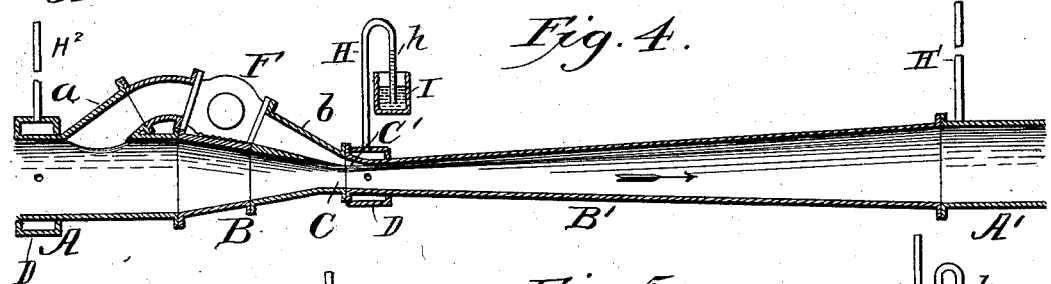
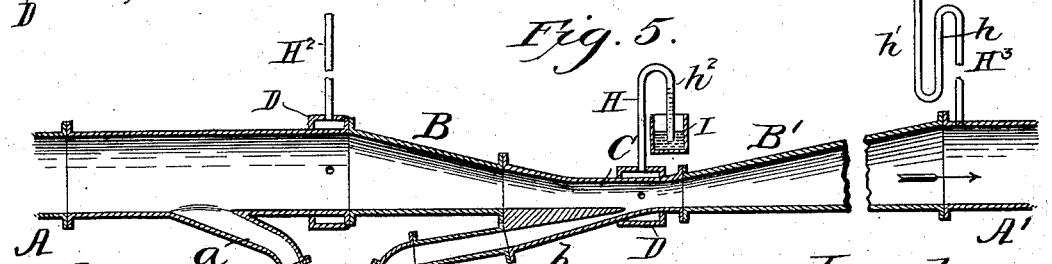

No. 749,645. PATENTED JAN. 12, 1904.
A. S. TUTTLE.
FLUID METER.
APPLICATION FILED APR. 29, 1901.
NO MODEL. 2 SHEETS—SHEET 2.

WITNESSES:

INVENTOR

No. 749,645. Patented January 12, 1904.

UNITED STATES PATENT OFFICE.

ARTHUR S. TUTTLE, OF BROOKLYN, NEW YORK, ASSIGNOR TO THE NATIONAL METER COMPANY, A CORPORATION OF NEW YORK.

FLUID-METER.

SPECIFICATION forming part of Letters Patent No. 749,645, dated January 12, 1904.

Application filed April 29, 1901. Serial No. 58,045. (No model.)

*To all whom it may concern:*

Be it known that I, ARTHUR S. TUTTLE, a citizen of the United States, and a resident of New York city, borough of Brooklyn, in the county of Kings and State of New York, have invented a new and Improved Fluid-Meter, of which the following is a full, clear, and exact description.

My invention relates to an improvement in fluid-meters; and it consists of certain novel parts and combinations of parts particularly pointed out in the claims.

In the use of a Venturi tube for measuring flow of fluids (liquids and gases) much difficulty has been experienced in the operation and errors caused in the registration, owing to the complicated character of the mechanism in use for translating pressure into terms of its equivalent volume.

In proportional or inferential meters it is a matter of prime importance to maintain as nearly as possible proportionality between the two streams in order that the quantity flowing in one stream, being ascertained by any suitable means, will correctly indicate the total quantity flowing in both streams. I have discovered that this proportionality may be obtained with greater uniformity than heretofore under wider variations of flow by the employment of a plurality of Venturi tubes, and this I claim as my invention irrespective of the particular means employed for determining the quantity flowing in the measured stream, as various means of ascertaining this quantity, directly or indirectly, are known.

One of the objects of my present invention is to apply to a Venturi tube a registering mechanism of such a character as to be operated directly by the volume of fluid passing through it, for this purpose making use of any type of meter capable of being so used. The method adopted for securing this result is to divide the fluid flowing between a plurality of Venturi tubes (preferably of different capacities) and to measure the water flowing through one of them by means of a fluid-registering mechanism of any approved and reliable construction, thus forming a proportional meter by securing an approximately proportional flow through the tubes at all rates of flow.

Figs. 1, 2, 3, 4, and 5 show in horizontal section various modifications in detail of construction, all embodying the same principle. Fig. 6 shows in plan view my device connected in common to two pipes.

The following is a description of my invention as embodied in the accompanying drawings.

In the drawings, A and A' respectively represent the pipes preceding and following the Venturi tubes, B the contracting cone, and B' the expanding cone, of the larger Venturi tube, which is inserted in said pipe, or of the two tubes combined, the same being shown as proportioned in accordance with the usual practice, in which the angle for the contracting cone is more obtuse than that used in the expanding cone. The flow of water is in all the figures supposed to be from the left toward the right or in the direction of the arrows. The portion C at the junction of the two cones I have termed the "throat." From a suitable point in front of the throat $c$, preferably before the reduction in size begins, leads a branch pipe or by-pass $a$, the water which flows through this by-pass being restored to the main pipe at a point which may vary from beyond the section B' of the Venturi tube, as is shown in Fig. 1, to the throat, as shown in Figs. 4 and 5. Included within this by-pass is a fluid-measuring device of any approved or desired form. I have herein indicated a meter F as being inserted adjacent the point where the water is taken from the main point. In this by-pass is inserted a Venturi tube which is smaller than that in the main pipe. In Figs. 1, 2, and 3 this Venturi tube consists of the cones $b$ and $b'$ and the throat $c'$. In Figs. 4 and 5 (which illustrate forms of my invention which are at present preferred by me) the cone B' is made common to both tubes, receiving the discharge from each throat. In Figs. 2 and 3 the cones B' are to some extent common to both tubes. In Figs. 1 and 2 valves G and G' are shown in the by-pass, by which the flow may be stopped when desired, as to examine or test the registering device.

It is one of the properties of the Venturi tube that the reduction of the area of the passage converts the pressure into velocity, so that under some conditions the pressure at the throat disappears or becomes a vacuum, and also that as this velocity is decreased by the expansion of the passage after passing the throat the pressure is largely restored, the amount lost by friction being dependent upon the relative actual velocity of the water and the angle of contraction and expansion of cones B and B'. In all cases when there is a flow through the meter the pressure at the throat is less than that either before or after passing the throat.

E is a pipe providing a communication between the large and small throats in Figs. 1, 2, and 3, which pipe is preferably provided with a valve E', so that the throats may be disconnected, if desired.

D $d$ are chambers surrounding the throats and having communication therewith through perforations in the walls of the throats. Similar chambers may be attached to the throats of the forms of meters shown in Fig. 5 and also at the upstream end of the cones, and all of them may be used for attaching any suitable pressure-indicating instruments in the manner well known in this art for the purpose of testing the meters by measurement of the loss in pressure between the chambers and the corresponding velocity. The most common form of such instrument is called a "piezometer" and consists of a pipe or tube connected with the pipe which carries the flow of water and provided with means for measuring the pressure, which is sometimes less than atmospheric. Such pipes H, H', $H^2$, and $H^3$ are shown in connection with Figs. 4 and 5. Where the pipe will be required only to indicate positive pressures, it may be a simple open-ended pipe extending upward above the level to which the water will rise, as shown with pipes H' and $H^2$. If desired, the pipe may be bent downward and then upward, as shown by the parts $h$ and $h'$ of Fig. 5, and the part $h'$ be filled with mercury. Where the pressure is apt to be a negative one or less than atmosphere, the pipe should have a downward bend, as $h^2$ of Fig. 5, and dip in a vessel, as I, of mercury. Such devices are in no way essential to the proper operation of my invention, but are mere instruments attached thereto to indicate the conditions obtaining within the device. Any other form of instrument which will indicate pressures might be substituted therefor. It is of course obvious that a greater number of tubes than two may be used in practicing my invention. In Fig. 6 three tubes are used, two consisting of conveying-pipes having a Venturi tube B B' inserted in each, and the measuring-tube $a$ $a'$ having therein the meter F' and the Venturi tube $b$ $b'$.

It is possible by reason of the small volume of water passing through the by-pass to place thereon a meter of any approved construction which will accurately measure its flow and which may have its registering mechanism so geared as to correctly indicate the combined flow through main and by-pass pipes. It will be understood that Figs. 2, 3, 4, and 5, as well as Fig. 1, show structures comprising "plural Venturi tubes" within the meaning of that term as employed in the claims concluding this specification.

The forms herein illustrated are not the only ones in which my invention may be embodied, but are given only as examples of certain forms which illustrate my invention. I do not, therefore, desire to be limited to the forms herein shown, but desire to claim my invention broadly, even when embodied in forms differing widely in appearance from those herein shown if they employ substantially the same principle of operation.

Having thus fully described my invention, I claim as new and desire to secure by Letters Patent—

1. A fluid-measuring device comprising plural Venturi tubes having common supply and discharge pipes, and a fluid-registering mechanism acted upon by the flow through one of said Venturi tubes.

2. A meter comprising plural Venturi tubes having a common supply connection, said tubes discharging under substantially equal heads, and a registering mechanism acted upon by the flow through one of said tubes.

3. A meter comprising plural Venturi tubes connected to a common supply and having a pressure-equalizing connection between their throats and a registering mechanism acted upon by the flow through one of said tubes.

4. A meter comprising plural Venturi tubes connected to a common supply and having a common expanding section and a registering mechanism acted upon by the flow through one of said tubes.

In testimony whereof I have signed my name to this specification in the presence of two subscribing witnesses.

ARTHUR S. TUTTLE.

Witnesses:
H. L. REYNOLDS,
CHAS. J. RATHPEN.